United States Patent [19]

Hatakenaka et al.

[11] Patent Number: 5,282,049
[45] Date of Patent: Jan. 25, 1994

[54] MOVING-PICTURE DATA DIGITAL RECORDING AND REPRODUCING APPARATUSES

[75] Inventors: Akira Hatakenaka, Tokyo; Shinichi Imade, Iruma; Seiichi Wakamatsu, Tokyo; Kenji Kishi, Yokohama, all of Japan

[73] Assignee: Olympus Optical Co., Ltd., Tokyo, Japan

[21] Appl. No.: 831,802

[22] Filed: Feb. 4, 1992

[30] Foreign Application Priority Data

| Feb. 8, 1991 | [JP] | Japan | 3-017380 |
| Mar. 18, 1991 | [JP] | Japan | 3-052503 |
| May 2, 1991 | [JP] | Japan | 3-100699 |
| May 24, 1991 | [JP] | Japan | 3-120058 |
| May 24, 1991 | [JP] | Japan | 3-120344 |

[51] Int. Cl.⁵ ............... H04N 5/76; H04N 5/783
[52] U.S. Cl. .................. 358/335; 358/312
[58] Field of Search ........... 358/335, 310, 339, 133, 358/312, 342; 360/33.1, 32

[56] References Cited

U.S. PATENT DOCUMENTS

| 4,361,849 | 11/1982 | Bolger | 360/10.1 |
| 4,672,444 | 6/1987 | Bergen et al. | 358/140 |
| 4,774,562 | 9/1988 | Chen et al. | 358/133 |
| 4,780,761 | 10/1988 | Daly et al. | 358/133 |
| 4,931,879 | 6/1990 | Koga et al. | 358/335 |
| 4,942,465 | 7/1990 | Ohta | 358/136 |
| 5,040,061 | 8/1991 | Yonemitsu | 358/342 |
| 5,073,820 | 12/1991 | Nakagawa et al. | 358/133 |
| 5,136,391 | 8/1992 | Minami | 358/312 |
| 5,140,437 | 8/1992 | Yonemetsu et al. | 358/342 |

FOREIGN PATENT DOCUMENTS

| 63-9289 | 1/1988 | Japan . |
| 63-76141 | 4/1988 | Japan . |
| 63-179679 | 7/1988 | Japan . |

Primary Examiner—Tommy P. Chin
Assistant Examiner—Huy Nguyen
Attorney, Agent, or Firm—Frishauf, Holtz, Goodman & Woodward

[57] ABSTRACT

During a recording operation, when receiving compressed moving-picture data from the moving-picture compression encoder, the code arrangement converter rearranges the data so that the core frame data may be distribution-recorded in a particular place on each track of the tape, for example, in the head portion of the main data area. In normal reproduction, the reproduced main data undergoes error correction and deinterleaving at the format reverse-converter. The resulting date is rearranged by the code arrangement reverse-converter to form the compressed moving-picture data in the same arrangement in recording. This compressed moving-picture data passes through the moving-picture expansion decoder and appears at the output terminal. During high-speed reproduction, for example, 9-fold speed reproduction, the main data in a frame corresponding to one of core frames 0 to 8 is reproduced. The resulting signal undergoes error correction and deinterleaving at the format reverse-converter. This deinterleaved data is supplied to the local read data arrangement circuit, which extracts one core frame of data. This data is decoded at the moving-picture expansion decoder and supplied at the output terminal.

10 Claims, 16 Drawing Sheets

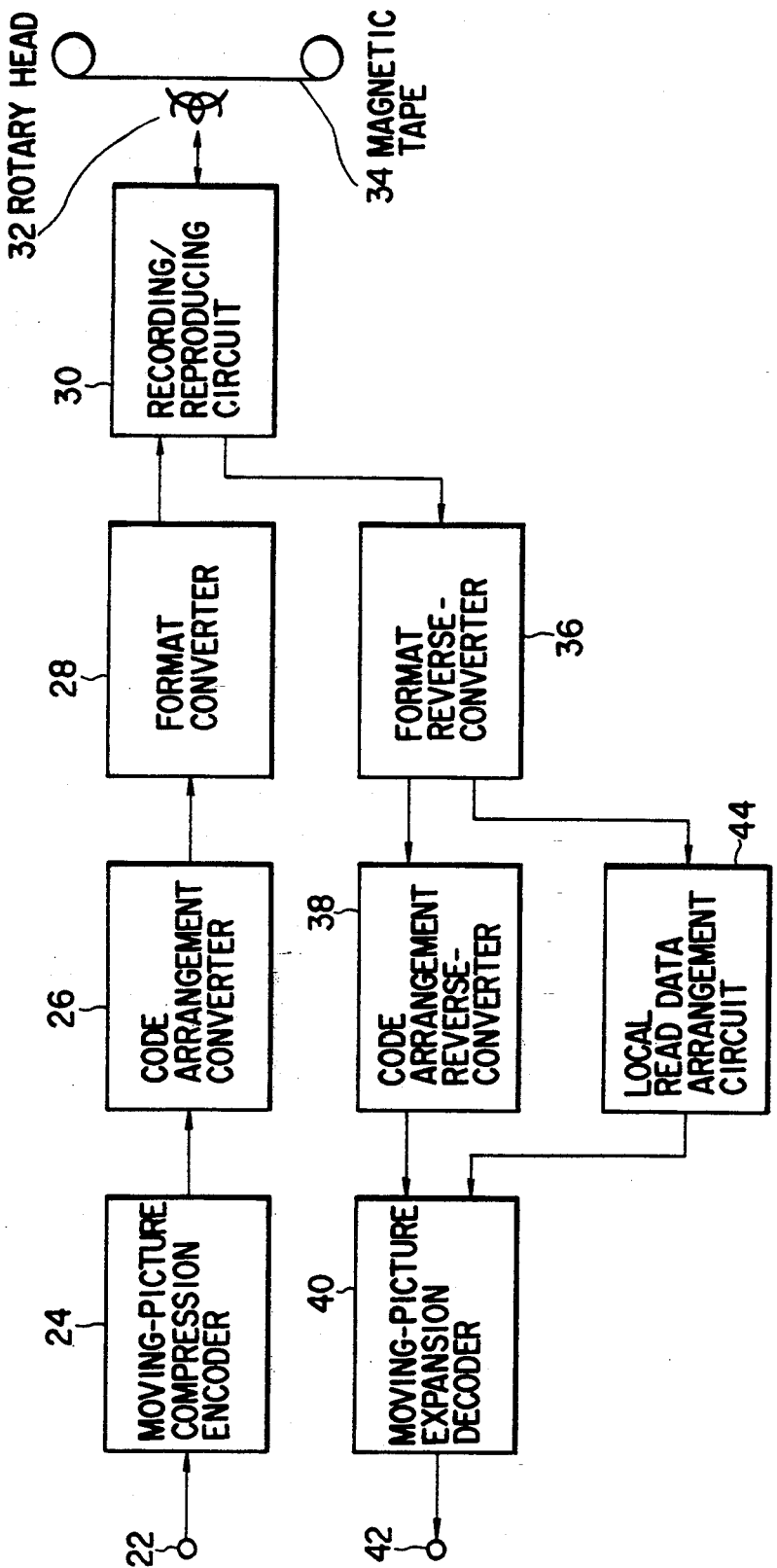
F I G. 1

GROUP 0

| FRAME 0 | I 0 | S 0 | I 0 | S 1 |
|---|---|---|---|---|
| 1 | | S 2 | | S 3 |
| 2 | | S 4 | | S 5 |
| 3 | | S 6 | | S 7 |
| 4 | | S 8 | | S 9 |
| 5 | | S10 | | S11 |
| 6 | | S12 | ↓ | S13 |
| 7 | ↓ | S14 | | |
| 8 | I 1 | S 0 | I 1 | S 1 |
| 9 | | S 2 | | S 3 |
| 10 | | S 4 | | S 5 |
| 11 | | S 6 | | S 7 |
| 12 | | S 8 | | S 9 |
| 13 | | S10 | | S11 |
| 14 | | S12 | ↓ | S13 |
| 15 | ↓ | S14 | | |
| 16 | I 2 | S 0 | I 2 | S 1 |
| 17 | | S 2 | | S 3 |
| 18 | | S 4 | | S 5 |
| 19 | | S 6 | | S 7 |
| 20 | | S 8 | | S 9 |
| 21 | | S10 | | S11 |
| 22 | | S12 | ↓ | S13 |
| 23 | ↓ | S14 | | |
| 24 | I 3 | S 0 | I 3 | S 1 |
| 25 | | S 2 | | S 3 |
| 26 | | S 4 | | S 5 |
| 27 | | S 6 | | S 7 |
| 28 | | S 8 | | S 9 |
| 29 | ↓ | S10 | ↓ | S11 |

| FRAME 30 | I 3 | S12 | I 3 | S13 |
|---|---|---|---|---|
| 31 | ↓ | S14 | | |
| 32 | I 4 | S 0 | I 4 | S 1 |
| 33 | | S 2 | | S 3 |
| 34 | | S 4 | | S 5 |
| 35 | ↓ | S 6 | ↓ | S 7 |
| 36 | | | | |
| 37 | | | | |
| 38 | | | | |
| 39 | | | | |
| 40 | | | | |
| 41 | ///| /// | /// | /// |
| 42 | /// | /// | /// | /// |
| 43 | /// | /// | /// | /// |
| 44 | /// | /// | /// | /// |

FIG. 7

GROUP 1

| FRAME 0 | I 4 | S 8 | I 4 | S 9 |
|---|---|---|---|---|
| 1 | | S10 | | S11 |
| 2 | | S12 | | S13 |
| 3 | | S14 | | |
| 4 | I 5 | S 0 | I 5 | S 1 |
| 5 | | S 2 | | S 3 |
| 6 | | S 4 | | S 5 |
| 7 | | S 6 | | S 7 |
| 8 | | S 8 | | S 9 |
| 9 | | S10 | | S11 |
| 10 | | S12 | | S13 |
| 11 | | S14 | | |
| 12 | I 6 | S 0 | I 6 | S 1 |
| 13 | | S 2 | | S 3 |
| 14 | | S 4 | | S 5 |
| 15 | | S 6 | | S 7 |
| 16 | | S 8 | | S 9 |
| 17 | | S10 | | S11 |
| 18 | | S12 | | S13 |
| 19 | | S14 | | |
| 20 | I 7 | S 0 | I 7 | S 1 |
| 21 | | S 2 | | S 3 |
| 22 | | S 4 | | S 5 |
| 23 | | S 6 | | S 7 |
| 24 | | S 8 | | S 9 |
| 25 | | S10 | | S11 |
| 26 | | S12 | | S13 |
| 27 | | S14 | | |
| 28 | I 8 | S 0 | I 8 | S 1 |
| 29 | | S 2 | | S 3 |

| FRAME 30 | I 8 | S 4 | I 8 | S 5 |
|---|---|---|---|---|
| 31 | | S 6 | | S 7 |
| 32 | | S 8 | | S 9 |
| 33 | | S10 | | S11 |
| 34 | | S12 | | S13 |
| 35 | | S14 | | |
| 36 | | | | |
| 37 | | | | |
| 38 | | | | |
| 39 | | | | |
| 40 | | | | |
| 41 | ///// | ///// | ///// | ///// |
| 42 | ///// | ///// | ///// | ///// |
| 43 | ///// | ///// | ///// | ///// |
| 44 | ///// | ///// | ///// | ///// |

FIG. 8

| SLICE 0 | x3-0 | | | x3-1 | | | x3-2 | | |
|---|---|---|---|---|---|---|---|---|---|
| 1 | 10 | 13 | 16 | 12 | 15 | 18 | 11 | 14 | 17 |
| 2 | 10 | 13 | 16 | 12 | 15 | 18 | 11 | 14 | 17 |
| 3 | 11 | 14 | 17 | 10 | 13 | 16 | 12 | 15 | 18 |
| 4 | 11 | 14 | 17 | 10 | 13 | 16 | 12 | 15 | 18 |
| 5 | 12 | 15 | 18 | 11 | 14 | 17 | 10 | 13 | 16 |
| 6 | 12 | 15 | 18 | 11 | 14 | 17 | 10 | 13 | 16 |
| 7 | 10 | 13 | 16 | 12 | 15 | 18 | 11 | 14 | 17 |
| 8 | 10 | 13 | 16 | 12 | 15 | 18 | 11 | 14 | 17 |
| 9 | 11 | 14 | 17 | 10 | 13 | 16 | 12 | 15 | 18 |
| 10 | 11 | 14 | 17 | 10 | 13 | 16 | 12 | 15 | 18 |
| 11 | 12 | 15 | 18 | 11 | 14 | 17 | 10 | 13 | 16 |
| 12 | 12 | 15 | 18 | 11 | 14 | 17 | 10 | 13 | 16 |
| 13 | 10 | 13 | 16 | 12 | 15 | 18 | 11 | 14 | 17 |
| 14 | 10 | 13 | 16 | 12 | 15 | 18 | 11 | 14 | 17 |
| | 11 | 14 | 17 | 10 | 13 | 16 | 12 | 15 | 18 |

FIG. 9

| SLICE | x5-0 | | x5-1 | | x5-2 | | x5-3 | | x5-4 | |
|---|---|---|---|---|---|---|---|---|---|---|
| 0 | 10 | 17 | 12 |  |  |  |  |  |  |  |
| 1 | 10 | 17 | 12 |  |  |  |  |  | 13 | 15 |
| 2 | 13 | 15 | 10 | 17 | 14 | 16 | 11 | 18 | 13 | 15 |
| 3 | 13 | 15 | 17 | 17 | 14 | 16 | 11 | 18 | 11 | 18 |
| 4 | 11 | 18 | 13 | 15 | 12 |  | 14 | 16 | 11 | 18 |
| 5 | 11 | 18 | 13 | 15 | 12 |  | 14 | 16 | 14 | 16 |
| 6 | 14 | 16 | 11 | 18 | 10 | 17 | 12 |  | 14 | 16 |
| 7 | 14 | 16 | 11 | 18 | 10 | 17 | 12 |  | 12 |  |
| 8 | 12 |  | 16 |  | 13 | 15 | 10 | 17 | 12 |  |
| 9 | 12 |  | 16 |  | 13 | 15 | 10 | 17 | 10 | 17 |
| 10 | 10 | 17 | 12 | 14 | 11 | 18 | 13 | 15 | 10 | 17 |
| 11 | 10 | 17 | 12 | 14 | 11 | 18 | 13 | 15 | 13 | 15 |
| 12 | 13 | 15 | 10 | 17 | 16 |  | 11 | 18 | 13 | 15 |
| 13 | 13 | 15 | 10 | 17 | 16 |  | 11 | 18 | 11 | 18 |
| 14 | 11 |  | 13 | 15 | 12 | 14 | 16 |  | 11 | 18 |
|  |  |  |  |  | 10 | 17 | 12 | 14 | 16 |  |

FIG. 10

|       | x9-0 | x9-1 | x9-2 | x9-3 | x9-4 |
|-------|------|------|------|------|------|
| SLICE 0 | I 0 | I 8 | I 7 | I 6 | I 5 |
| 1     | I 0 | I 8 | I 7 | I 6 | I 5 |
| 2     | I 1 | I 0 | I 8 | I 7 | I 6 |
| 3     | I 1 | I 0 | I 8 | I 7 | I 6 |
| 4     | I 2 | I 1 | I 0 | I 8 | I 7 |
| 5     | I 2 | I 1 | I 0 | I 8 | I 7 |
| 6     | I 3 | I 2 | I 1 | I 0 | I 8 |
| 7     | I 3 | I 2 | I 1 | I 0 | I 8 |
| 8     | I 4 | I 3 | I 2 | I 1 | I 0 |
| 9     | I 4 | I 3 | I 2 | I 1 | I 0 |
| 10    | I 5 | I 4 | I 3 | I 2 | I 1 |
| 11    | I 5 | I 4 | I 3 | I 2 | I 1 |
| 12    | I 6 | I 5 | I 4 | I 3 | I 2 |
| 13    | I 6 | I 5 | I 4 | I 3 | I 2 |
| 14    | I 7 | I 6 | I 5 | I 4 | I 3 |

|       | x9-5 | x9-6 | x9-7 | x9-8 |
|-------|------|------|------|------|
| SLICE 0 | I 4 | I 3 | I 2 | I 1 |
| 1     | I 4 | I 3 | I 2 | I 1 |
| 2     | I 5 | I 4 | I 3 | I 2 |
| 3     | I 5 | I 4 | I 3 | I 2 |
| 4     | I 6 | I 5 | I 4 | I 3 |
| 5     | I 6 | I 5 | I 4 | I 3 |
| 6     | I 7 | I 6 | I 5 | I 4 |
| 7     | I 7 | I 6 | I 5 | I 4 |
| 8     | I 8 | I 7 | I 6 | I 5 |
| 9     | I 8 | I 7 | I 6 | I 5 |
| 10    | I 0 | I 8 | I 7 | I 6 |
| 11    | I 0 | I 8 | I 7 | I 6 |
| 12    | I 1 | I 0 | I 8 | I 7 |
| 13    | I 1 | I 0 | I 8 | I 7 |
| 14    | I 2 | I 1 | I 0 | I 8 |

F I G. 11

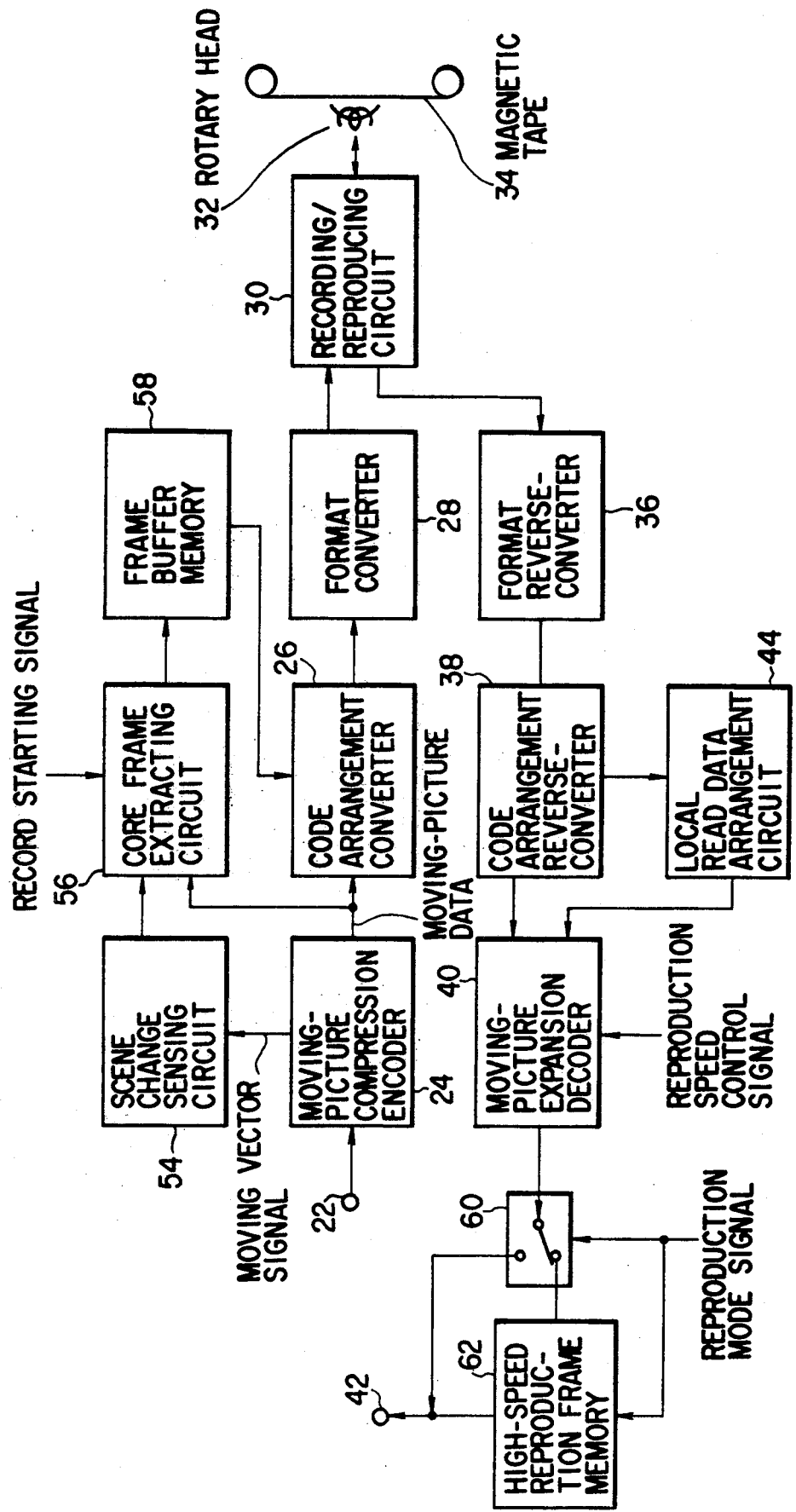
F I G. 16

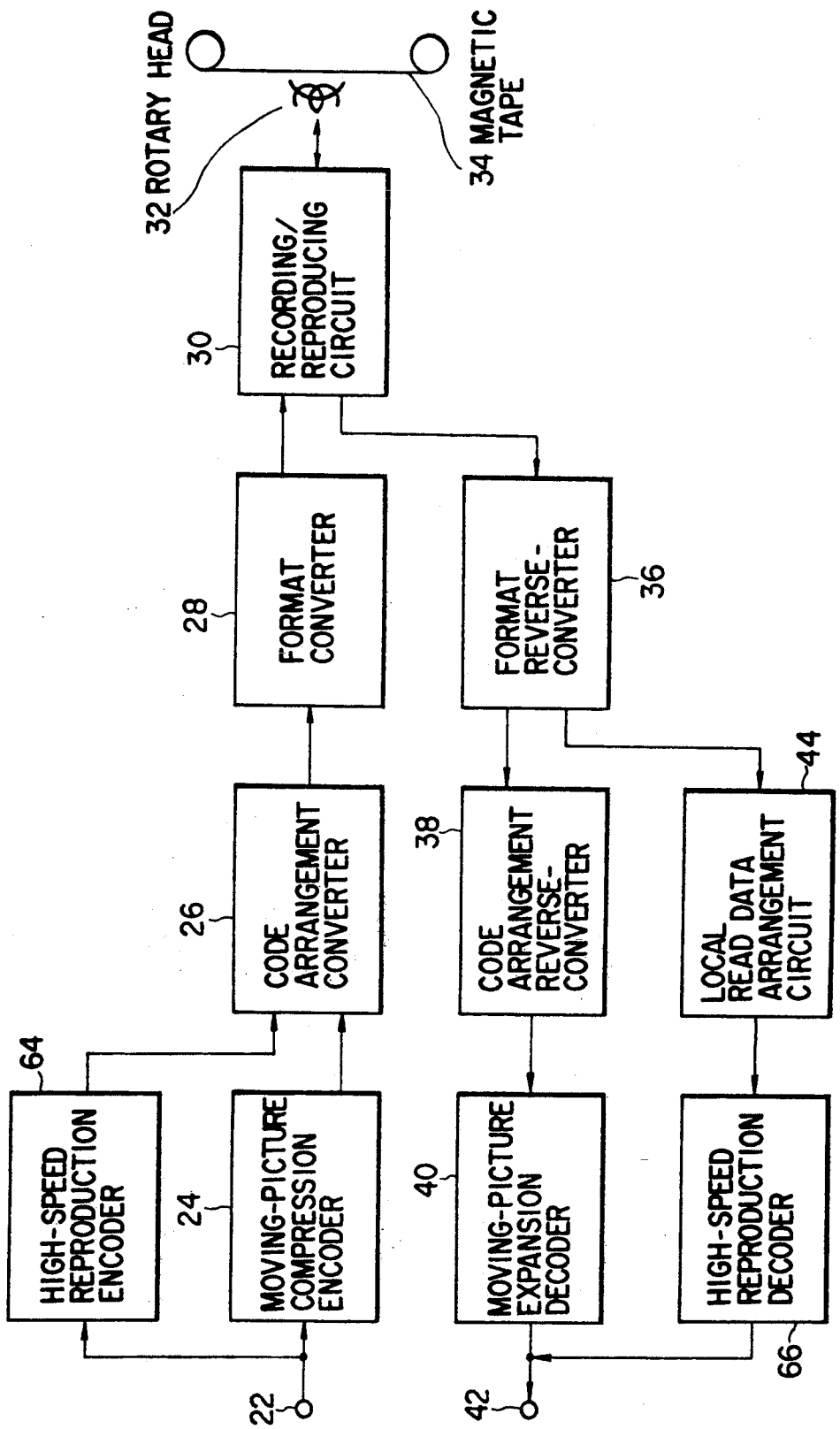
F I G. 19

MOVING-PICTURE DATA DIGITAL RECORDING AND REPRODUCING APPARATUSES

BACKGROUND OF THE INVENTION

1. Field of the Invention

This invention relates to moving-picture digital recording and reproducing apparatuses such as digital tape recorders, and more particularly to a moving-picture data recording and reproducing system capable of high-speed reproduction.

2. Description of the Related Art

Digital audio tape (DAT), originally developed for audio use, is finding wide application as an external memory in the field of computers where it is standardized in DATA/DAT format.

In a moving-picture data recording/reproducing apparatus using helical scanning digital tape such as DATA/DAT, tracking based on automatic track fining (ATF) is performed during high-speed reproduction by controlling the rotational speed of the cylinder so that the bit rate of the reproduced signal may be equal to that for normal reproduction according to the tape speed. For an n-fold speed reproduction, if n is odd, data on tracks with both positive and negative azimuth angles can be reproduced at intervals of n tracks, and if n is even, data on tacks with either a positive or a negative azimuth angle can be reproduced at intervals of 2n tracks.

In general, digital recording has the advantage of less degradation of pictures during dubbing, but has the disadvantage of requiring a larger amount of data than analog recording. Therefore, in recording moving-picture data on a tape medium by helical scanning, even one frame of picture data extends over several tracks, with the result that high-speed reproduction cannot be achieved by simply increasing the tape speed as in analog recording.

At the time of decoding compressed moving-picture data, defects in the data heavily affect the picture quality and complicate the decoding process. For this reason, to achieve high-speed reproduction, it is necessary to use a recording format suitable for high-speed reproduction in recording moving-picture data on DATA/DAT.

SUMMARY OF THE INVENTION

Accordingly, the object of the present invention is to provide moving-picture data digital recording and reproducing apparatuses that use a new recording/reproducing system capable of easy high-speed reproduction of moving-picture data.

The foregoing object is accomplished by a moving-picture data digital recording apparatus comprising: first picture-data forming means for receiving digital moving-picture data and forming normal-speed reproduction picture data for normal-speed reproduction; second picture-data forming means for receiving digital moving-picture data and forming high-speed reproduction picture data for high-speed reproduction; third picture-data forming means for forming digital recording picture data for digital recording on a recording medium, out of the normal-speed and high-speed reproduction picture data formed at the first and second picture-data forming means, the digital recording picture data having such a data arrangement that the high-speed reproduction picture data are distribution-recorded in a particular place on each track of the recording medium; and recording means for recording on the recording medium the digital recording picture data formed at the third picture-data forming means.

The foregoing object is also accomplished by a moving-picture data digital reproducing apparatus comprising: reproducing means for reproducing digital recording data, which is recorded on a recording medium and has such a data arrangement that high-speed reproduction picture data for high-speed reproduction is distribution-recorded in a particular place on each track of the recording medium; first picture-data forming means for forming normal-speed reproduction picture data for normal-speed reproduction out of the digital recording data reproduced by the reproducing means; second picture-data forming means for, in high-speed reproduction, forming high-speed reproduction picture data out of the digital recording data reproduced from the particular place by the reproducing means; and third picture-data forming means for forming digital moving-picture data out of the normal-speed reproduction picture data from the first picture-data forming means during normal-speed reproduction, and out of the high-speed reproduction picture data from the second picture-data forming means during high-speed reproduction.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram for a first embodiment of the present invention;

FIG. 7 shows the relationship between each frame and each slice within group 0 of 15 slices of 9 I pictures within DATA/DAT groups 0 and 1 in a second embodiment of present invention;

FIG. 8 shows the relationship between each frame and each slice within group 1 of 15 slices of 9 I pictures within DATA/DAT groups 0 and 1 in the second embodiment;

FIG. 9 is a table for I picture that is reproduced and displayed in each slice position during triple-speed reproduction;

FIG. 10 is a table for I picture that is reproduced and displayed in each slice position during quintuple-speed reproduction;

FIG. 11 is a table for I picture that is reproduced and displayed in each slice position during 9-fold speed reproduction;

FIG. 16 is a block diagram for a fourth embodiment of the present invention;

FIG. 19 is a block diagram of a fifth embodiment of the present invention; and

DETAILED DESCRIPTION OF THE PREFERRED EMBODIMENTS

Referring to the accompanying drawings, embodiments of the present invention will be explained.

Figure 2:
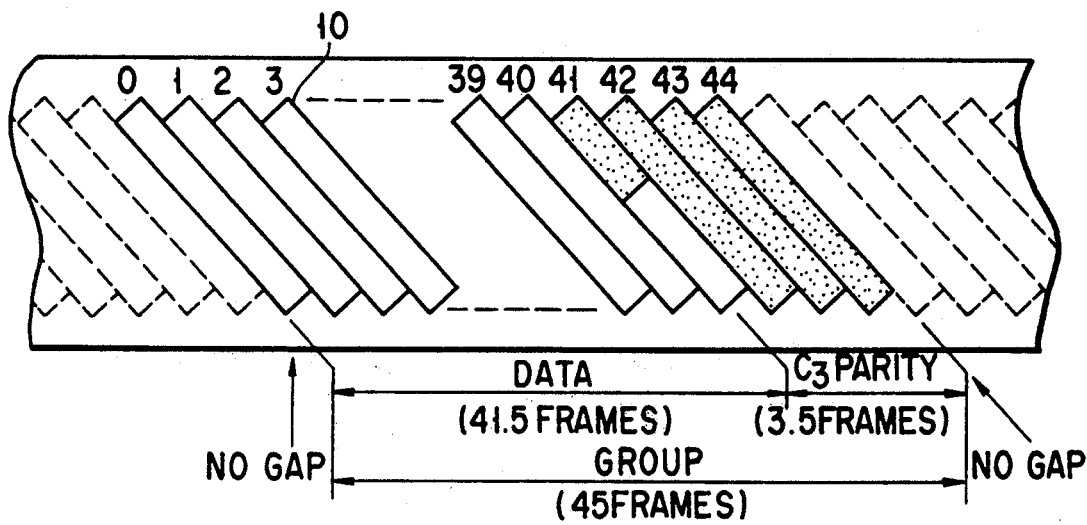
FIG. 2 is a schematic representation of DATA/DAT group format 1.
Figure 3:
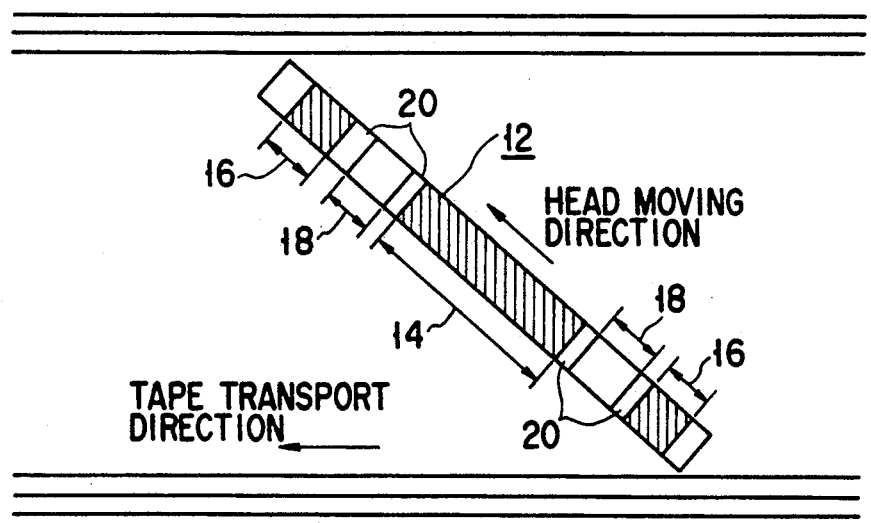
FIG. 3 is an illustration of track format.

FIG. 1 shows the construction of a first embodiment of the present invention. For example, this embodiment may be a helical scanning tape recorder that records moving-picture data in tape format as shown in FIG. 2. FIG. 2 schematically shows DATA/DAT group format 1. In the figure, frame 10 is composed of a positive azimuth track followed by a negative azimuth track. Each track 12, as shown in FIG. 3, is made up of a main data area 14, sub-code areas 16, automatic track finding (ATF) areas 18, and margin areas 20.

The main data area 14 is an area in which audio or video data is to be recorded. The sub-code areas 16 are areas in which various data necessary for main data reproduction and attendant data are to be recorded. The former data includes the type of information recorded in the main data area 14, the tape speed, the data sampling frequency, the quantization rules, and the data compression rules. The latter data includes the program time, the time code, the date and time, and the signal for program search. The ATF areas 18 are where a tracking signal is to be recorded which is necessary for the recording/reproducing head to trace the track 12 properly. The margin areas 20 are provided between the main data area 14 and the AFT areas 18 and between each ATF area 18 and each sub-code area 16, respectively, so that independent after recording can be preformed.

Figure 4:
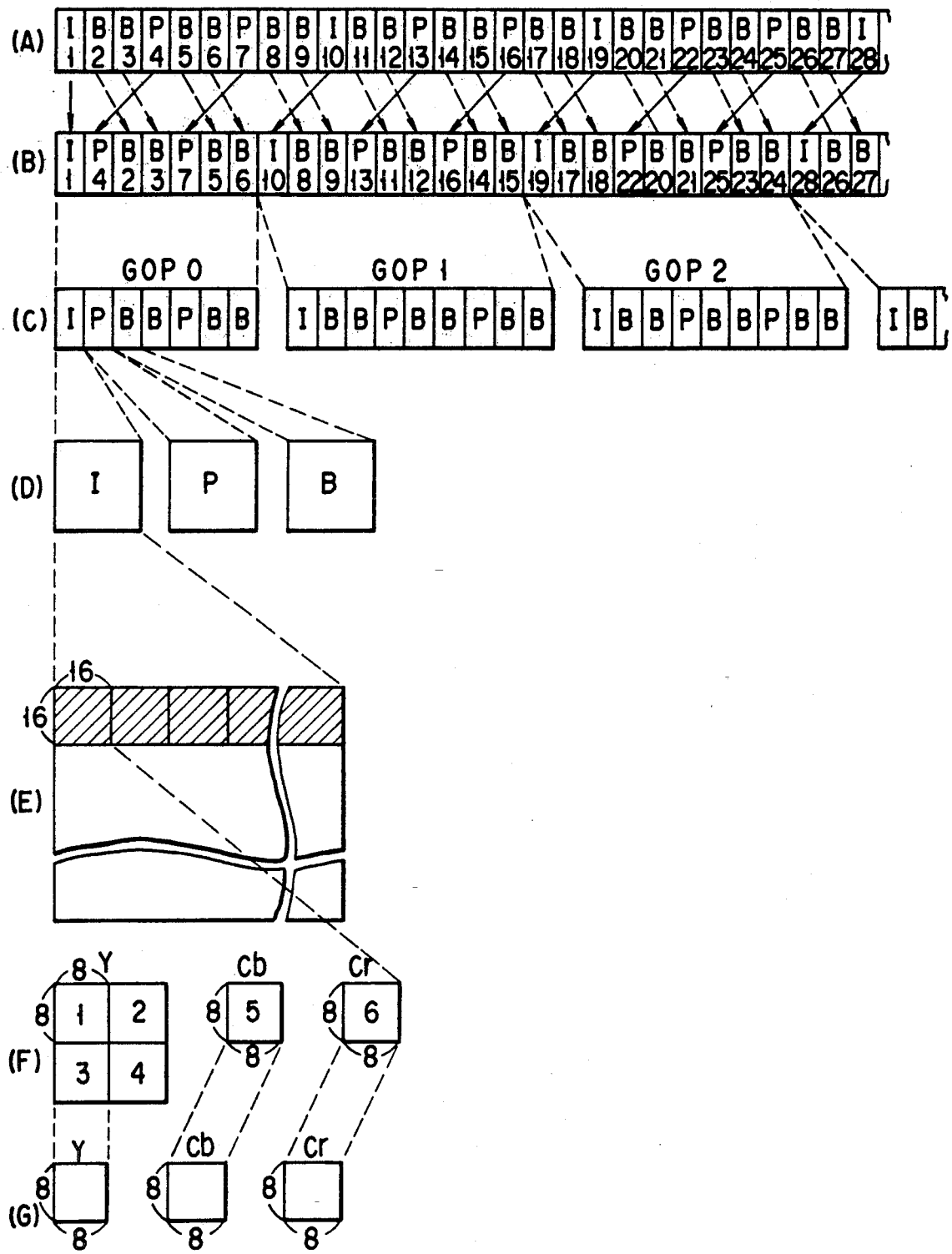
FIG. 4 shows the hierarchy structure of moving-picture data handled in the embodiment.

In FIG. 1, the camera section (not shown) supplies moving-picture data to the input terminal 22 in the form of digital signal. Layer (A) in FIG. 4 represents the video sequence layer of the digital moving-picture data supplied to the input terminal 22. The digital moving-picture data has the picture sequence as shown in this layer (A).

Figures 5, 6:
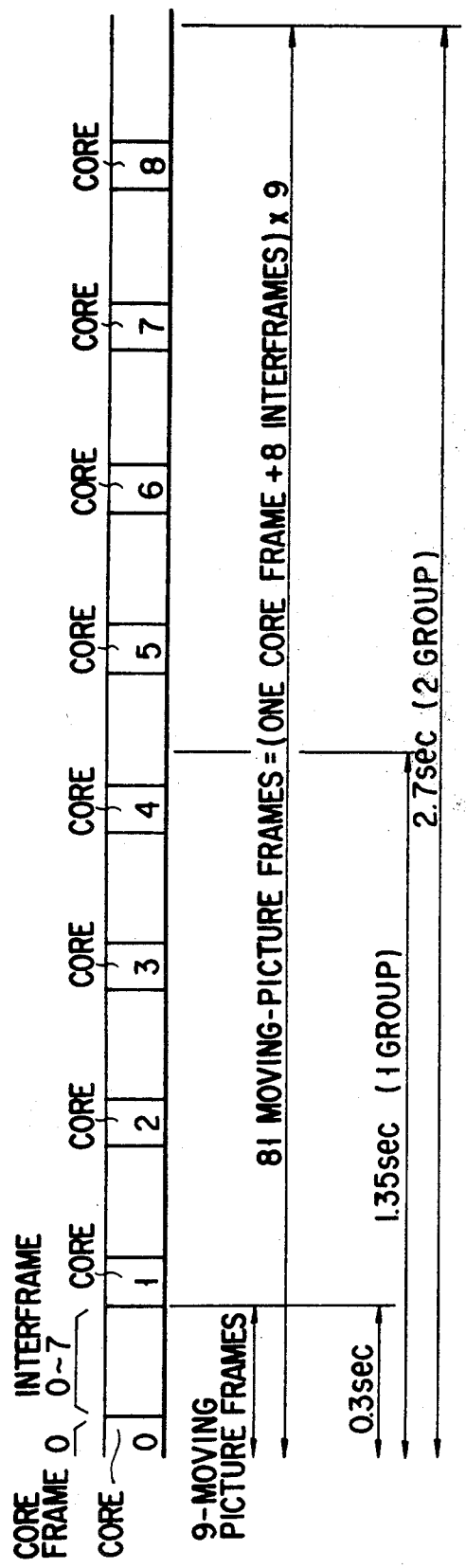
FIG. 5 illustrates compression encoded moving-picture data.
FIG. 6 is a table for explaining a distribution arrangement of core frame data.

The digital moving-picture data supplied to the input terminal 22 is compression-encoded by a moving-picture compression encoder 24. This encoder 24, as disclosed in U.S. Pat. No. 4,780,761 or U.S Pat. No. 5,073,820, for example, performs compression encoding, such as distributed cosine transformation (DCT) and two-dimensional Huffman coding. FIG. 5 is a schematic view of moving-picture data compression-encoded by the moving-picture encoder 24. In the figure, the core frame contains data on a moving-picture frame obtained by compressing only the information within one moving-picture frame, and the interframe contains data on a moving-picture frame obtained by compressing the information within two or more moving-picture frames.

The compression-encoded output of the moving-picture encoder 24 will be explained in more detail. In layer (B) of FIG. 4, the compression-encoded output pictures of the moving-picture encoder 24 are sequenced so as to correspond to the sequence of the original pictures in layer (A).

Layer (C) of FIG. 4 is a layer of groups of pictures (GOPs), each GOP having nine pictures except that the first GOP is made up of seven pictures.

Layer (D) is a picture layer. In the figure, characters I, B, P represent I picture, B picture, and P picture, respectively. I picture is an encoded picture capable of being decoded irrespective of the past and the future pictures and corresponds to the core frame. P picture is an encoded picture using the motion compensation prediction based on the past I picture or P picture, and B picture is an encoded picture using the motion compensation prediction based on the past or future I picture or P picture. These P picture and B picture correspond to the interframe. In this embodiment, each picture includes 15 slices.

Layer (E) is a slice layer, where a value by which the quantization matrix is multiplied, the quantizer scale (QS), is updated by slice.

Layer (F) is a macroblock layer, where Y represents a luminance component and Cb and Cr indicate color-difference components, each color-difference component being half as large as the luminance component in the lateral and longitudinal directions. Motion compensation prediction is made by macroblock, and QS is also updated by macroblock.

Layer (G) is a block layer. As seen from the figure, one block of 16×16 pixels is composed of four Y blocks, one Cb block, and one Cr block. The block is used as a unit in DCT calculation or zigzag scanning.

In FIG. 1, the moving-picture data compression-encoded at the moving-picture compression encoder 24 is supplied to a code arrangement converter 26. This converter 26 converts the arrangement of the encoded data so that the high-speed reproduction data (core frame data) may be recorded in particular places as described later.

The encoded data whose arrangement has been converted at the code arrangement converter 26 is supplied to a format converter 28, which converts it into recording data that follows the recording format complying with the standards of the digital tape recorder used. What the format converter 28 does includes addition of C1, C2, and C3 error-correction codes and transformation into DATA/DAT format (or interleaving). After having been modulated at a recording/reproducing circuit 30, the recording data is supplied via a recording amplifier (not shown) to a recording/reproducing rotary head 32, which records it in the main data area 14 of a magnetic tape 34.

After the signal sensed by the rotary head 32 has been demodulated at the recording/reproducing circuit 30, it is deinterleaved and error-corrected at a format reverse-converter 36. The output signal of the reverse-converter 36, after having been converted into the encoded data in the original sequence at a code arrangement reverse-converter 38, is decoded by a moving-picture expansion decoder 40. The resulting signal is supplied as a moving-picture signal at the output terminal 42 in the sequence shown in layer (A) of FIG. 4.

During high-speed reproduction, a local read data arrangement circuit 44 concatenates pieces of data read from the particular recording places according to the speed of high-speed reproduction, the data being supplied from the format reverse-converter 36. It then produces an encoded data according to the high-speed reproduction speed and supplies it to the moving-picture expansion decoder 40.

The operation of this construction will be explained in detail.

First, during a recording operation, the code arrangement converter 26, when receiving a compressed moving-picture data as shown in FIG. 5 from the moving-picture compression encoder 24, changes the arrangement of data so that the core frame data may be recorded in particular places on the tape. The particular places correspond to the frame portions in FIG. 6. The number of blocks in each frame portion is previously determined depending on the amount of data in the core frame. To the shaded portion 46 of FIG. 6, however, the core frame data is not allocated because it contains C3 error-correction code added by the format converter 28 at the later stage.

During normal reproduction, reproduced main data is error-corrected and deinterleaved by the format reverse-converter 36, and is changed by the code arrangement reverse-converter 38 into compressed moving-picture data that is rearranged in the same sequence as that in recording shown in FIG. 5. This moving-picture data is supplied via the moving-picture expansion decoder 40 at the output terminal 42.

In the case of 9-fold speed reproduction, the main data of frames corresponding to one of core frames 0 to 8 in FIG. 6 is reproduced, and then error-corrected and deinterleaved at the format reverse-converter 36. This deinterleaved data is supplied to the local read data arrangement circuit 44, which takes out data from one core frame. This data is decoded by the moving-picture expansion decoder 40 and the resulting signal is supplied at the output terminal 42.

In triple-speed reproduction, the main data of frames corresponding to one of the following three-core groups of core frames 0, 3, 6, and core frames 1, 4, 7, and core frames 2, 5, 8 among combinations of core frames 0 to 8 in FIG. 6, is reproduced, and then error-corrected and deinterleaved by the format reverse-converter 36. This deinterleaved data is supplied to the local read data arrangement circuit 44, which takes out data from three core frames. These data are decoded at the moving-picture expansion encoder 40 and then supplied at the output terminal 42.

As noted above, in this embodiment, moving-picture data that has been compressed in units of two groups in DATA/DAT group format 1, is recorded in 81 moving-picture frames. At that time, distributing and recording 9 core frames at intervals of nine frames allows high-speed reproduction with 9-fold speed or triple speed and the reproducing of one or three core frames per two groups.

For high-speed reproduction with n-fold speed, by allocating the number of blocks according to the data volume of core frame to consecutive areas of positive azimuth tracks located at intervals of n frames, core frame data is distributed and recorded as follows, where F indicates the frame number in the group:

| | | | | |
|---|---|---|---|---|
| Core frame 0 | → $F_0$, | $F_n$, | $F_{2n}$, | ... |
| Core frame 1 | → $F_1$, | $F_{n+1}$, | $F_{2n+1}$, | ... |
| Core frame 2 | → $F_2$, | $F_{n+2}$, | $F_{2n+2}$, | ... |
| | | ... | | |
| Core frame (n−1) | → $F_{(n-1)}$, | $F_{n+(n-1)}$, | $F_{2n+(n-1)}$, | ... |

When data recorded as described above is reproduced at n-fold speed, core frame data for one of core frames 0 to (n−1) will be reproduced. If n/2, n/3, ... are integers, respectively, reproduction at n/2-fold speed, n/3-fold speed, ... allows reproduction of 2, 3, ... pieces of core frame data for core frames 0 to (n−1).

Although in the above embodiment, the compressed moving-picture data has such format that a fixed core frame is provided for every nine moving-picture frames, and all core frames are used for high-speed reproduction, it is not always necessary for all core frame data to be recorded in the particular places for high-speed reproduction. For example, only some core frames may be recorded in the particular places for high-speed reproduction, or several core frames may be recorded in this place, allowing duplication. In the first embodiment, high-speed reproduction, normal or reverse, may be made at any speed, not limited to triple speed or 9-fold speed.

A second embodiment of the present invention will be explained. While in the first embodiment, core frame data is distributed and recorded in particular places on the tape so as to mate with intervals of frames to be reproduced during high-speed reproduction, in the second embodiment, slices of core frame data are distributed to the individual frames to record them in particular places.

Specifically, in a recording operation, when moving-picture data (layer (A) data) as shown in FIG. 4 is supplied to the input terminal 22, the moving-picture compression encoder 24 performs DCT on I picture in blocks. It carries out linear quantization and two-dimensional Huffman coding in its first passing to compute the amount of codes generated in blocks and slices. Then, the optimum QS value and the amount of codes allocated to each block are determined based on this calculated amount of codes generated and the amount of codes allocated to each slice (a fixed value for I picture) for the first passing. In the second passing, linear quantization is carried out using the optimized QS. The two-dimensional Huffman coding is performed in the order of zigzag scanning, while terminating the encoding, if necessary, so that the result may be within the amount of codes allocated to each slice.

After having performed motion compensation prediction in macroblocks for P picture and B picture, the moving-picture compression encoder 24 carries out DCT in blocks. Motion compensation of P picture is made only for the forward direction (motion compensation for the past picture), and motion compensation of B picture may be made for any of the forward direction, the backward direction (motion compensation for the future picture), and both directions.

Next, the moving-picture compression encoder 24 performs linear quantization and two-dimensional Huffman coding in the first passing only. It then compares the target amount of codes with the amount of codes generated, to determine the next target amount of codes and QS for each of P picture and B picture.

The amount of codes allocated in slices to each picture in the second embodiment is as follows:
 I picture—1280 bytes (fixed)
 P picture—460 bytes (initial value)
 B picture—115 bytes (initial value)

The moving-picture data compression-encoded as described above is supplied to the code arrangement converter 26. The code arrangement converter 26 changes the arrangement of data so that the slices of I picture may be distributed to each frame on the tape. At this time, the moving-picture data of 9 GOPs are recorded in units of two groups in DATA/DAT format. FIGS. 7 and 8 show the relationship between each frame and each slice of 9 I pictures within the group. In the figures, it is assumed that symbols I0 to I8 are the numbers of I pictures, and S0 to S14 are the numbers of slices. 86400 bytes of audio data for two groups are recorded simultaneously, and data of P and B pictures is recorded in the remaining part of the tape on which I picture and audio data have been recorded. Therefore, because of variations in the amount of codes, The nine GOPs do not always fit in two groups, with the result that there may be a case where the group boundary does not agree with the GOP boundary.

Then, the format converter 28 adds error correction parity to the encoded data, whose arrangement has been converted at the code arrangement converter 26, and then interleaves it. The results are supplied as DATA/DAT main data to the recording/reproducing circuit 30.

During normal reproduction, the format reverse-converter 36 performs error correction and deinterleaving on the reproduced main data, and supplies the resulting encoded data to the code arrangement reverse-converter 38. The code arrangement reverse-converter 38 converts the I picture data, arranged so as to be distributed to each frame, and the B and P picture data into those in the original sequence, and supplies the resulting encoded data to the moving-picture expansion encoder 40. The expansion encoder 40 decodes the encoded data into moving-picture data and supplies it at the output terminal 42.

During high-speed reproduction, data in tracks at intervals corresponding to the reproduction speed is reproduced. The format reverse-converter 36 performs error correction and deinterleaving on this data and supplies the resulting data to the local read data arrangement circuit 44. The local read data arrangement circuit 44 picks out the slices of I picture from the input data.

FIGS. 9 to 11 show the I picture number of each slice reproduced at this time. FIG. 9 shows the numbers for triple speed, FIG. 10 for quintuple speed, and FIG. 11 for 9-fold speed. In the figure, for example, "×3−0" means that the head traces frame 0 at triple speed.

The I picture slice data picked out at the local read data arrangement circuit 44 is decoded at the moving-picture expansion decoder 40 and supplied as moving-picture data at the output terminal 42.

As explained above, in the second embodiment, I picture can be reproduced at high speeds in slices according to various speeds, by compression-encoding moving-picture data in slices of I picture in the form of fixed length, and distributing and recording the slices of 9 I pictures on each frame in units of two groups in DATA/DAT group format 1.

While in the above embodiment, a GOP is composed of 9 pictures and a picture is made up of 15 slices, they may be composed of in other ways. In addition to triple speed quintuple speed and 9-fold speed used in the embodiment, other speeds may be used in high-speed reproduction, normal and reverse. Further, the amount of codes allocated in compression encoding in the second embodiment may be changed. The amount of codes may be controlled in another way.

In the first and second embodiments, various places can be thought of as particular places on which core frame data is distribution-recorded.

Figure 12:
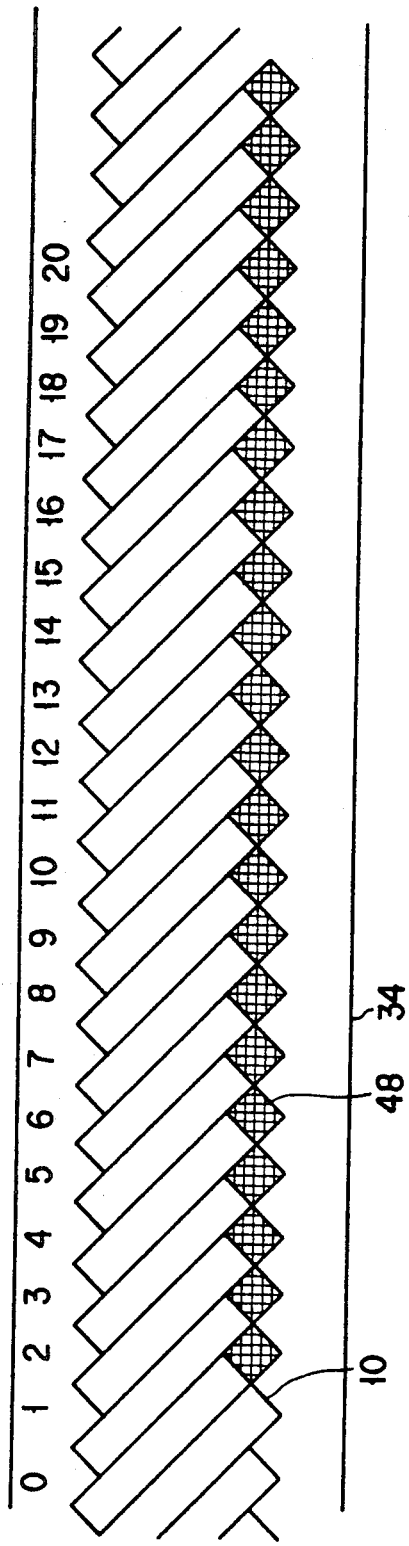
FIG. 12 shows particular places on the frame in which core frame data is recorded in the first and second embodiments.

For example, as shown in FIG. 12, they may be the head portion 48 of each frame 10.

By investigating the course on the format along which the head is to trace during high-speed reproduction, and then distribution-recording core frame data on the course, ultrahigh-speed reproduction is possible. This will be explained as a third embodiment of the present invention, referring to the accompanying drawings.

In FIG. 1, the moving-picture compression encoder 24 segments the input moving picture data, in units of a specified number of frames, into blocks. At this time, the beginning frame data within a block is performed data compression, which is complete in the frame, that is, the in-frame data compression to form core frame data. Interframe compression is performed on the data in the remaining frames within the block, using motion compensation or interframe differential. When one block of data is compressed, the amount of codes is controlled so that the data amount in one block may be a specified amount. The compressing process within the block is continuously performed.

The encoded data from the moving-picture compression encoder 24 is supplied to the code arrangement converter 26. When the encoded data is actually recorded, this converter 26 changes the arrangement of the encoded data in a specified sequence so that core frame data may be distribution-recorded in particular places or local areas on the discrete tracks in a manner that allows reading in high-speed reproduction.

Figure 13:
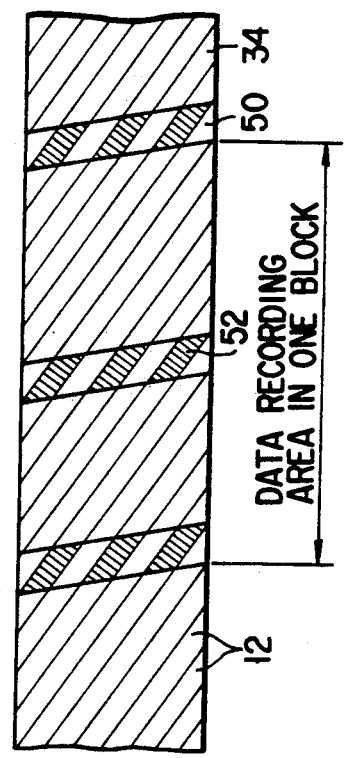
FIG. 13 is a view showing the data structure of one block of data recording area in a third embodiment of the present invention.

As shown in FIG. 13 during normal constant-speed reproduction, the head 32 can trace the track 12 sequentially and reproduces the data recorded on all tracks 12. In ultrahigh-speed reproduction, however, the trace 50 of the head 32 can pass through only the local areas 52 of the discrete tracks shown by shaded portions. For this reason, one block recording area is determined as shown in the figure, and core frame data is distribution-recorded on the local areas 52.

The encoded data from the code arrangement converter 26 is supplied to the format converter 28, which forms recording data according to the recording format. The recording format conforms to the standards of the digital tape recorder used.

The recording data from the format converter 28 is modulated at the recording/reproducing circuit 30, and then is recorded on the magnetic tape 34 with the rotary head 32.

Figure 14:
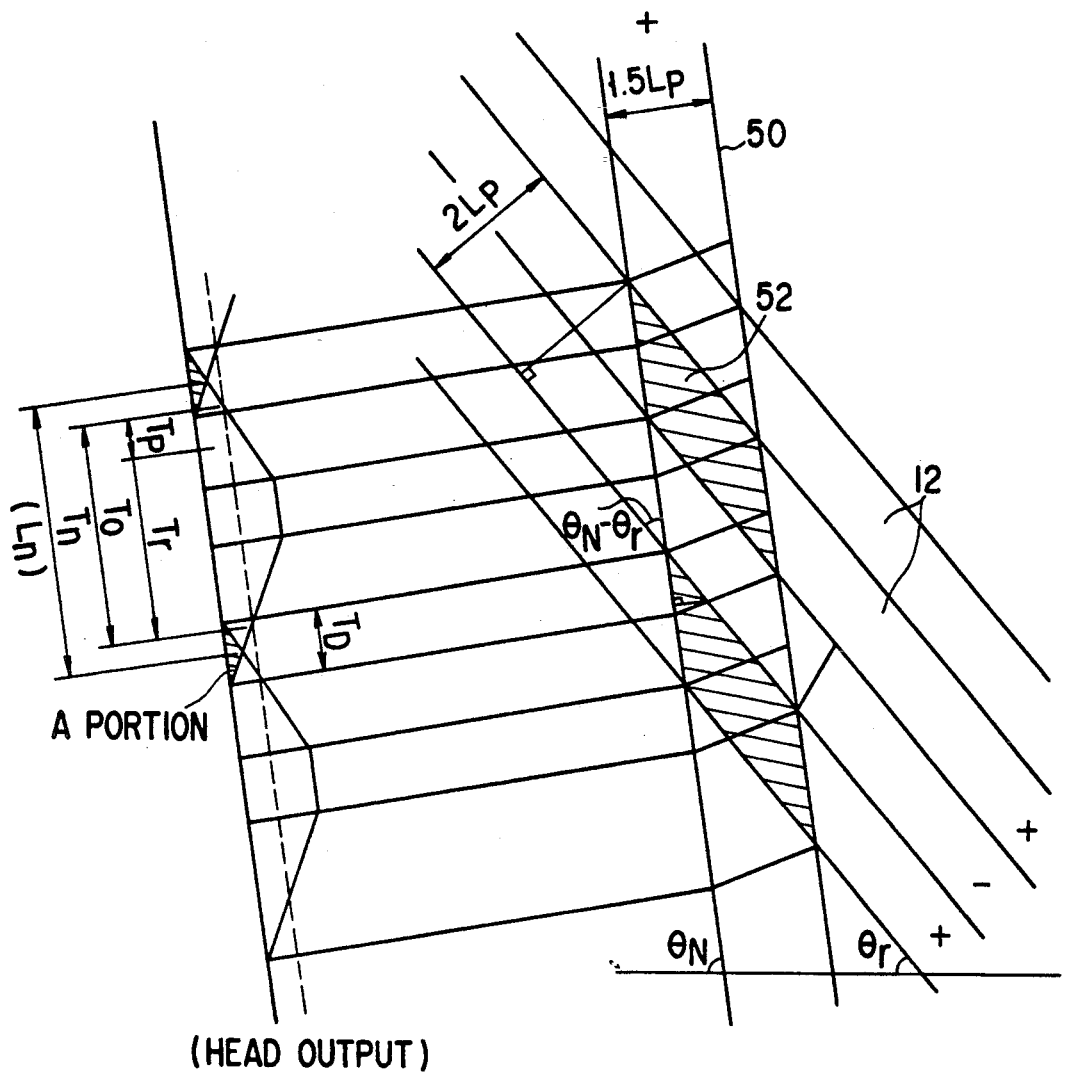
FIG. 14 is an explanatory view of the tracing of the head during ultrahigh-speed reproduction.

The recorded data is reproduced with the rotary head 32. FIG. 14 shows how the head 32 traces the tape during ultrahigh-speed reproduction. Because of azimuth recording, +tracks and −tracks 12 are located side by side alternately. Here, angle $\theta_N$ is an angle at which the head trace 50 crosses the tape transport direction during ultrahigh-speed reproduction and $\theta_r$ is an angle at which the head trace 50 meets the tape transport direction during normal reproduction. $T_n$ is the noise bar period, $T_o$ the on track time, $T_p$ the PLL pull-in time, $T_r$ the data read enable time, and $T_p$ the signal waveform interference time. For the local areas 52 on the tracks readable during ultrahigh-speed reproduction, the time when data can be read is the time $T_r$. If the on track coefficient a is $a = T_o/T_n$, $T_r$ will be:

$$T_r = aT_n - T_p$$

The pieces of data read during the time $T_r$ can be concatenated to one another to form core frame data. Each parameter depends on the recording and reproducing system, and is determined by a suitable equation accordingly.

When the data in the shaded portion in FIG. 14 is read out, the number of revolutions of the cylinder (not shown) is controlled so that the reading bit rate may be equal to that of normal reproduction.

Figure 15:
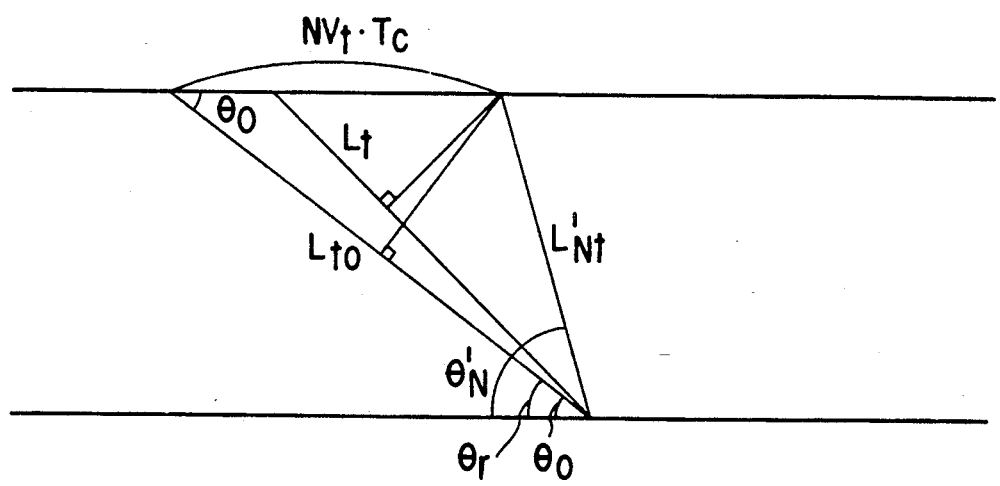
FIG. 15 is a view of head traces during ultrahigh-speed reproduction.

FIG. 15 illustrates the tracing of the head during ultrahigh-speed reproduction. To increase the tape transport speed $V_t$ to N-fold speed for ultrahigh-speed reproduction, the number of cylinder revolutions will be controlled so as to follow the equation:

Number of cylinder revolutions = $(60/T_c) \times$ (tape winding rate)

where $T_c$ is the time during which the tape 34 is in contact with the head 32. Making the bit rate in ultrahigh-speed reproduction equal to that in normal reproduction means that their relative speeds are made equal. If the relative speed in still reproduction is $V_{ro}$ and the still angle is $\theta_o$, the relative speed $V_{Nrr}$ during ultrahigh-speed reproduction will be:

$$V_{Nrr} = \{V_{ro}^2 - 2V_{ro}NV_t\cos\theta_o + (NV_t)^2\}^{\frac{1}{2}} \times \cos(\theta_{N'} - \theta_r)$$

where $\theta_r$ is the track angle in normal reproduction, and $\theta_{N'}$ the track angle in ultrahigh-speed reproduction. The relative speed $V_{ro}$ is controlled so that the relative speed $V_{Nrr}$ may equal the relative speed in normal reproduction. Because the relative speed $V_{ro}$ is $V_{ro} = L_{to}/T_c$ with the trace length $L_{to}$ being constant in still reproduction, the relative speed $V_{ro}$ is varied by controlling the contact time $T_c$. Controlling the contact time $T_c$ means that the number of cylinder revolutions is changed according to the above equation.

After the data reproduced at an ultrahigh speed at the recording/reproducing circuit 30 of FIG. 1 has undergone format reverse-conversion at the format reverse-converter 36, it is supplied to the local read data arrangement circuit 44, which concatenates the pieces of data read from the discrete areas to reproduce a piece of core frame data. This reproduced data is supplied to the moving-picture expansion encoder 40, which expands the data. Then, core frame picture data appears at the output terminal 42.

As noted above, with the third embodiment, it is possible to reproduce the core frame data of recorded moving picture data even when the tape is transported at an ultrahigh speed. This allows video high-speed searching even when moving pictures are recorded on magnetic tape in the form of compressed data.

Although various places in the main data area 14 have been explained so far for particular places to which core frame data is distribution-recorded, the sub-code areas 16 may be used. This will be described in detail as a fourth embodiment of the present invention, referring to the accompanying drawings.

In the fourth embodiment, picture data for normal-speed reproduction is recorded in the main data area 14, whereas picture data for high-speed reproduction (core frame data) and various attendant information are recorded in the sub-code areas 16. Picture data for high-speed reproduction is recorded in the sub-code areas 16 by repeatedly recording the same signals on a plurality of tracks in succession.

Because the data for high-speed reproduction recorded in the way described above is recorded in the sub-code areas 16, this high-speed reproduction data can be reproduced during high-speed reproduction.

The fourth embodiment will be explained, using a case where compressed moving-picture data is recorded on DATA/DAT.

FIG. 16 shows the construction of the fourth embodiment. For simplicity of explanation, description will focus exclusively on what is different from the construction of FIG. 1. The moving-picture compression encoder 24 outputs a moving vector signal as well as compression-encoded moving-picture data.

A scene change sensing circuit 54 senses whether or not there is any scene change based on the magnitude and direction of the moving vector supplied from the moving-picture compression encoder 24. Based on the record starting signal or the signal from the scene change sensing circuit 54, a core frame extracting circuit 56 picks out core frame picture data, which is required to be recorded for high-speed reproduction, from the moving-picture data compression-encoded at the moving-picture compression encoder 24. A frame buffer memory 58 for picture data is used to store high-speed reproduction pictures for recording.

The code arrangement converter 26 mixes the high-speed reproduction picture data stored in the frame buffer memory 58 with the encoded moving-picture data from the moving-picture compression encoder 24 and arranges the resulting data so that the high-speed picture data may be recorded in a particular place of the track 12 or the sub-code areas 16.

A signal selector switch 60, according to the reproduction mode signal, selectively supplies the decoding output of the moving-picture expansion decoder 40 to the output terminal 42 and the high-speed reproduction frame memory 62. The high-speed reproduction frame memory 62 stores the decoded picture data supplied from the moving-picture expansion decoder 40 via the signal selector switch 60, and supplies it as the picture signal for high speed reproduction at the output terminal 42 until the next picture data is received.

The moving-picture expansion decoder 40 is designed to change the moving-picture expansion system between the normal reproduction mode and the high-speed reproduction mode.

The operation of this arrangement will be explained.

First, how moving-picture data is recorded will be described. The original signal of the moving picture input at the input terminal 22 undergoes I-frame compression, P-frame compression, and B-frame compression sequentially at the moving-picture compression encoder 24, as shown in layer (B) of FIG. 4. For example, it is assumed that the amount of codes for a core frame after compression is 16K bytes, and the amount of codes for one group (9 frames) is 48K bytes (the compression rate of effective pixels to the amount of data is approximately 1/130 in CCIR rec. 601). Then, the compression-encoded moving-picture data passes through the code arrangement converter 26, and is added with the error correction code C3 according to the DATA/-DAT format at the format converter 28. The format converter 28 also interleaves the resulting signal, adds error sensing and correction codes C1 and C2 to the interleaved signal, and converts it into the DATA/-DAT main data format. The signal thus obtained is modulated at the recording/reproducing circuit 30, passes through a recording amplifier (not shown), and is recorded in the main data area 14 of the magnetic tape 34 with the rotary head 32.

When recording of high-speed reproduction pictures is required in response to the record starting signal or the scene change occurrence signal from the scene change sensing circuit 54, the core frame extracting circuit 56 picks out one frame of I-frame data from the moving-picture data compression-encoded at the moving-picture compression encoder 24, and store it in the frame buffer memory 58. The code arrangement converter 26 mixes the high-speed reproduction picture data in the frame buffer memory 58 with the moving-picture data encoded at the moving-picture compression encoder 24 and arranges the results so that the high-speed reproduction picture data may be recorded in a particular place of the track 12 or the sub-code areas 16. The data to be recorded in the sub-code areas 16 is interleaved and added with an error correction code at the format converter 28. This converter 28 also adds to this data attendant information including the synchronous signal, ID code, frame address, and time base signal, and converts the resulting data into that in the DATA/DAT sub-code format. This converted data passes through the recording/reproducing circuit 30 and is recorded on the magnetic tape 34 with the rotary head 32.

Figure 17:
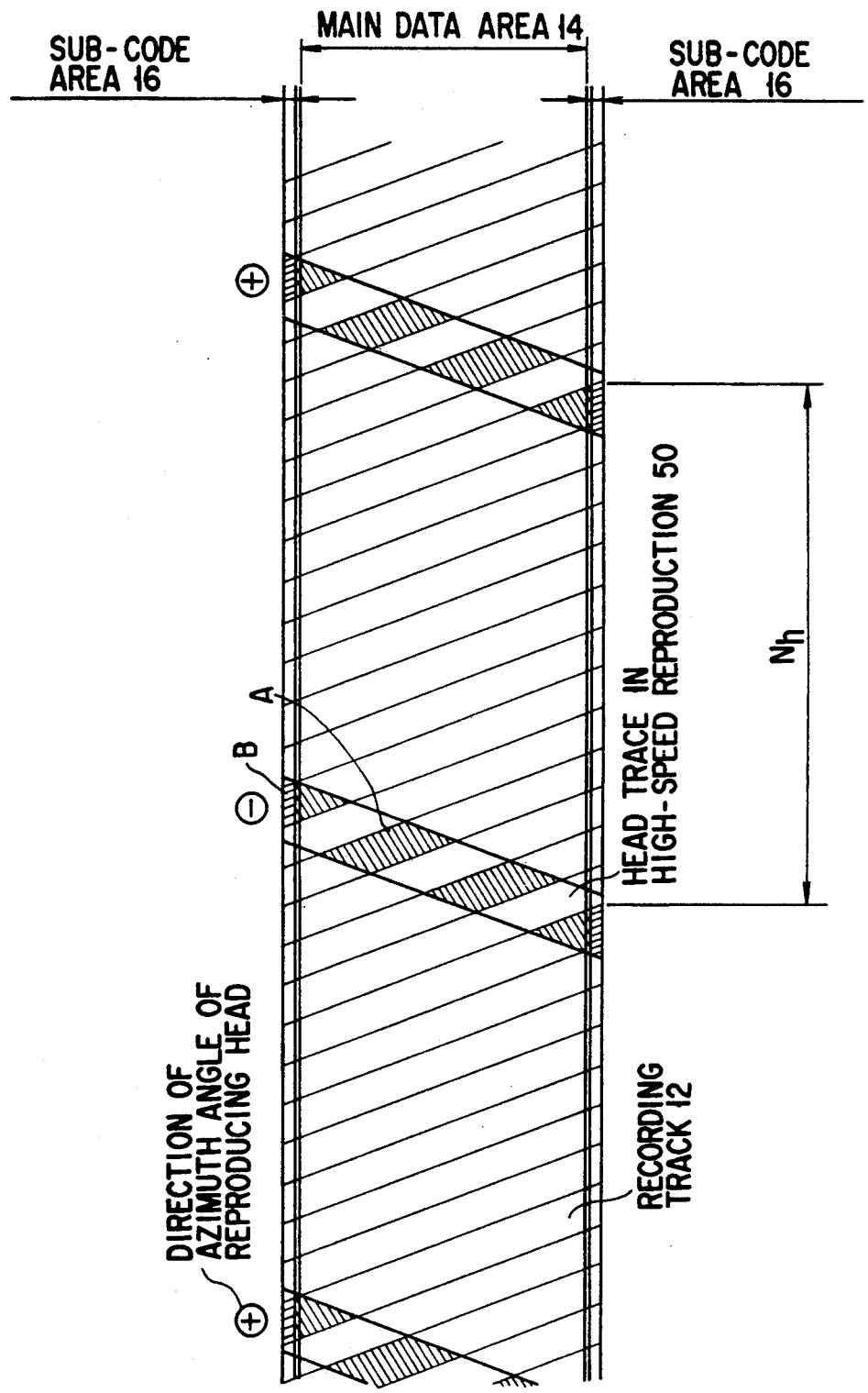
FIG. 17 illustrates recording format used in recording high-speed reproduction picture data in the sub-code area.

FIG. 17 illustrates the recording format used in recording high-speed reproduction picture data in the sub-code areas 16. In the figure, a portion indicated by reference character A is the main data area 14 in which reproducible data is to be recorded, and a portion indicated by reference character B is the sub-code areas 16 in which high-speed reproducible data is to be recorded.

As shown in FIG. 17, the trace 50 of the rotary head 32 during high-speed reproduction inclines at an angle to the recorded track 12. When the speed of high-speed reproduction exceeds a specific value, all signals in the sub-code areas 16 cannot be reproduced. The tape speed at this time is assumed to be $V_g$. Further, in high-speed reproduction, the readable tracks 12 in the sub-code areas 16 are discontinuous. If readable track intervals is $N_h$, the track interval $N_h$ becomes maximum when the tape speed is $V_g$.

The amount of codes that can be recorded in the sub-code areas 16 is as little as approximately 1/5 of the amount of codes in the main data area 14. To record compressed core frame picture data in the sub-code areas 16, several to tens of tracks are required.

Figure 18:
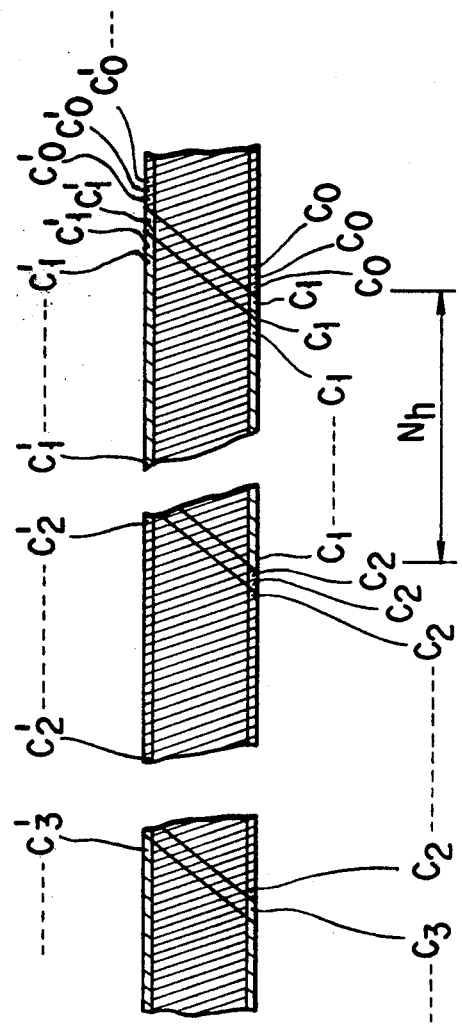
FIG. 18 shows the state where one frame of high-speed reproduction core frame data have been distributed and recorded in the sub-code areas on a plurality of tracks.

One frame of high-speed reproduction core frame data is distribution-recorded in the sub-code areas 16 of a plurality of tracks at track intervals $N_h$ as shown in FIG. 18. The picture data for the same high-speed reproduction is recorded the sub-code areas 16 of the tracks fitting in the track interval $N_h$.

The reproduction of the moving-picture data recorded in the magnetic tape 34 will be explained.

First, reproduction at a normal speed will be described. The signals sensed by the recording/reproducing rotary head 32 in the sub-code areas 16 and main data area 14 are amplified at the recording/reproducing circuit 30. This circuit 30 also performs waveform equalization, detection, and demodulation of the amplified signals. After these signals have been deinterleaved and error-corrected, they pass through the code arrangement reverse-converter 38 and are demodulated at the moving-picture expansion decoder 40. Then, the demodulated moving-picture signal is supplied via the signal selector switch 60 at the output terminal 42 in the order shown in layer (A) of FIG. 4.

High-speed reproduction will now be explained. The signal sensed by the rotary head 32 in the sub-code areas 16 during high-speed reproduction with a tape speed of $V_g$ or less, undergoes amplification, waveform equalization, detection, and demodulation at the recording/reproducing circuit 30. Then, after the format reverse-converter 36 has deinterleaved and performed error correction on the demodulated signal, the code arrangement reverse-converter 38 separates the data stored in the sub-code areas 16, and supplies it to the local read data arrangement circuit 44. This circuit 44 concatenates the pieces of data from the code arrangement reverse-converter 38 and supplies the result to the moving-picture expansion decoder 40, which decodes it into the core frame data. The decoded moving-picture signal passes through the signal selector switch 60 and is stored in the high-speed reproduction frame memory 62, which supplies it as the high-speed reproduction picture signal at the output terminal 42 until the next picture data is received.

Although in the fourth embodiment, a GOP layer is made up of 9 frames, it may be composed of in other ways. Allocation of I-frame, P-frame, and B-frame in the embodiment are illustrative and not restrictive.

While in the first to fourth embodiments, core frame data is used as high-speed reproduction picture data, other types of data may be used in the present invention. For example, it may be possible to form high-speed reproduction data different from normal compression-encoded moving-picture data, out of the input digital moving-picture data and then record it in particular places as described earlier.

When high-speed reproduction data is recorded in the head place of the main data area 14 of each frame 10 as shown in FIG. 12, the picture data recording area decreases accordingly. Because the high-speed reproduction data is used mainly for retrieval, even very rough picture quality is acceptable. For this reason, curtailing sub-samples would create no problem. When rough representation serves the needs, retrieval is possible using monochromatic pictures, omitting color difference components. In this way, compressing retrieval pictures as much as possible to record them in as many tracks as possible enables high-speed reproduction according to various speeds. Alternately recording the luminance signal and color-difference signal allows color display in double-speed reproduction and monochromatic display in high-speed reproduction at a speed faster than the double speed.

FIG. 19 is a block diagram of a fifth embodiment of the present invention, where high-speed reproduction data is formed separately. In the figure, what is different from the construction of FIG. 1 is an encoder 64 that forms high-speed reproduction picture data and a high-speed reproduction decoder 66. Because high-speed reproduction picture data must be reproduced independently within one frame, the high-speed encoder 64 extracts only the luminance component from the data supplied to the input terminal 22, and performs sub-sampling to compress data substantially.

In normal reproduction, the signal from the recording/reproducing rotary head 32 passes through the recording/reproducing circuit 30, format reverse-converter 36, and code arrangement reverse-converter 38, and reaches the moving-picture expansion decoder 40, which expands the picture. During high-speed reproduction, the signal from the recording/reproducing rotary head 32 goes through the recording/reproducing circuit 30, format reverse-converter 36, and local read data arrangement circuit 44, and enters the high-speed reproduction decoder 66, which expands the picture.

In this way, addition of high-speed reproduction data allows high-speed reproduction covering various speeds.

While in FIG. 12, high-speed reproduction data is added to all tracks, it may be added at intervals of several tracks. In this case, if the track interval is N, high-speed reproduction will be made at intervals of an integer multiple of N.

When high-speed reproduction picture data is recorded at intervals of 4 tracks (N=2), alternate recording of color difference and luminance enables color reproduction in double-speed reproduction and monochrome reproduction in quadruple-speed reproduction or faster. In this case, at the doubled speed, the picture changes only once for two frames. Monochrome high-speed scanning can be performed only on a quadruple speed basis.

While in the first to fifth embodiments, DATA/DAT group format 1 is used, group format 0 may be used. The present invention may be applied to apparatuses with a high transfer rate compatible with DATA/DAT multiple-speed and other helical scanning types of digital tape recorders.

Although in the previous embodiments, the helical scanning R-DAT is used, the present invention may be used to digital tape recorders such as S-DATs.

The S-DAT will be described below.

Figure 20:
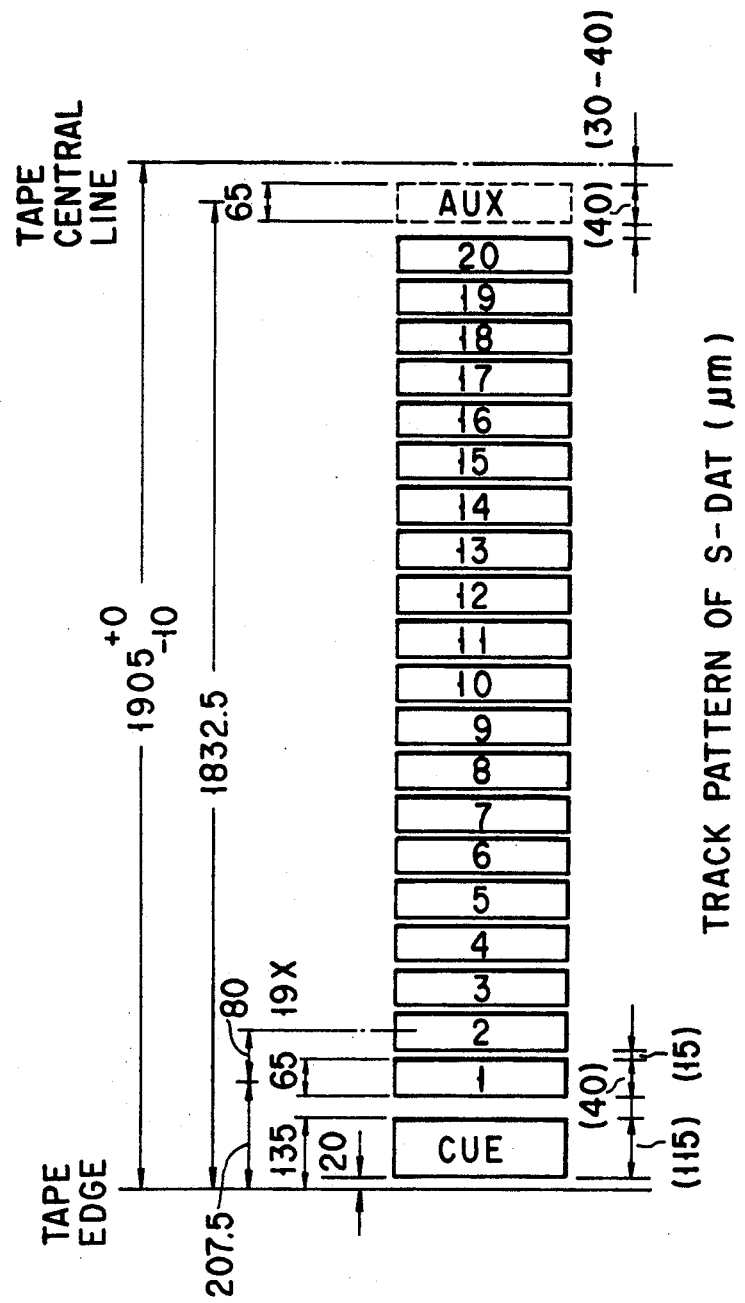
FIG. 20 is an illustration of the S-DAT track pattern in a sixth embodiment of the present invention.

FIG. 20 shows a temporary track format of the S-DAT.

A large difference between the S-DAT and the R-DAT is that 20 tracks are simultaneously recorded by a multichannel head in the S-DAT. Each channel is recorded in units of 240 bits=one frame. As portions corresponding to the main data and sub code areas of the R-DAT, 16 bits of frame=240 bits are used for sub code, and 192 bits thereof are used for main data and a C2 parity. The sub code capacity of the S-DAT is ½ that of the R-DAT.

The S-DAT has an AUX track which can be used as a sub code area. When high-speed reproduction image data is recorded on the AUX track, high-speed reproduction of an image can be easily performed without performing any specific tracking unlike in the R-DAT. However, when high-speed reproduction is performed in the S-DAT, a data rate during reproduction may be increased to fall outside the range of an IC band for signal processing and the like. In order to prevent this inconvenience, a high-speed reproduction signal need only be recorded on the AUX track at a data rate of 1/(multiple of high-speed reproduction rate).

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A moving-picture-data digital recording apparatus comprising:
   picture-data forming means including:
     segmenting means for segmenting digital moving-picture-data into a plurality of segments, each of said plurality of segments having a specified number of frames;
     slicing means for slicing data in a lead frame of each of said plurality of segments into a specified number of slices of lead frame data that respectively have a fixed length, the lead frame being defined as a core frame; and
   compressing means for providing an in-frame-compressing of data in said lead frame of each of said segments, and for providing an interframe-compressing of said digital moving-picture-data in a plurality of remaining frames of each of said plurality of segments;
   said picture-data forming means forming picture-data that is reproducible at a predetermined first speed of a recording medium;
   picture-data arrangement converting means having extracting means for extracting a plurality of slices of said lead frame data from the picture-data formed by said picture-data forming means, said picture-data arrangement converting means including converting means for converting an arrangement of said picture-data formed by said picture-data forming means wherein said extracted slices of said lead frame data, extracted by said extracting means, are distribution-recorded in a particular place on a plurality of tracks of said recording medium, as output second picture-data that is reproducible at a second speed of said recording medium, said second speed of said recording medium being higher than said predetermined first speed of said recording medium; and
   recording medium for digitally recording on said recording medium, said picture-data formed by said picture-data forming means, after said picture-data is converted and arranged by said converting means of said picture-data arrangement converting means.

2. The apparatus according to claim 1, wherein said converting means of said picture-data arrangement converting means converts the arrangement of said picture-data formed by said picture-data forming means, such that said slices of said lead frame data are distribution-recorded in said particular place on each of said plurality of tracks in accordance with a spacing between a plurality of frames reproduced during a reproduction at said second speed.

3. The apparatus according to claim 1, wherein said converting means in said picture-data arrangement converting means converts the arrangement of said picture-data formed by said picture-data forming means, such that said slices of data in said lead frame are distribution-recorded in a head portion of a main data area of each track of said recording medium, the head portion corresponding to said particular place on each of said plurality of tracks.

4. The apparatus according to claim 1, wherein:
said converting means of said picture-data arrangement converting means converts the arrangement of said picture-data formed by said picture-data forming means, such that said slices of said lead frame data are distribution-recorded in said particular place on each of said plurality of tracks, each of said particular places being a local area of a main data area on each track; and further comprising:
a reproducing head for tracing said local areas when the data recorded on said recording medium is reproduced at said second speed.

5. The apparatus according to claim 1, wherein said converting means in said picture-data arrangement converting means converts the arrangement of said picture-data formed by said picture-data forming means, such that said slices of said lead frame data are distribution-recorded in a plurality of sub-code areas on each of said plurality of tracks, each of said sub-code areas on each of said plurality of tracks corresponding to said particular place on each of said plurality of tracks.

6. A moving-picture-data digital reproducing apparatus comprising:
reproducing means including:
reproduction means for reproducing a plurality of digital recording data recorded on a recording medium;
said digital recording data being recorded on said recording medium after:
segmenting means segments digital-moving-picture-data into a plurality of segments, each segment having a specified number of frames; and
slicing means slices data in a lead frame of each of said plurality of segments into a specified number of slices of lead frame data that respectively have a fixed length, said lead frame being defined as a core frame;
picture data forming means for forming picture-data that is reproducible at a predetermined first speed of said recording medium, said picture-data forming means including:
compressing means for providing an in-frame-compressing of data in said lead frame of each of said segments, and for providing an inter-frame-compressing of said digital moving-picture-data in a plurality of remaining frames of each of said segments; and
extracting means for extracting said slices of said lead frame data from said picture-data formed by said picture-data forming means; and
arrangement converting means for converting an arrangement of said picture-data such that said extracted slices, extracted by said extracting means, are distribution-recorded in a particular place on a plurality of tracks of said recording medium, as output second picture-data that is reproducible at a second speed of said recording medium, said second speed being higher than said predetermined first speed of said recording medium;
said picture-data forming means further including:
first picture-data forming means for forming a first plurality of picture-data to be reproduced at said first speed, based on the digital recording data reproduced by said reproducing means;
second picture-data forming means for forming, when said picture-data is reproduced at said second speed, a second plurality of picture-data based on said digital recording data reproduced from said particular place on each of said plurality of tracks by said reproducing means; and
third picture-data forming means for forming, when said digital recording data is reproduced at said first speed, digital moving-picture-data based on said first plurality of picture-data formed by said first picture-data forming means, and for forming, when said digital recording data is reproduced at said second speed, digital moving-picture-data based on said second plurality of picture-data formed by said second picture-data forming means.

7. The apparatus according to claim 6, wherein said slices of said lead frame data are distribution-recorded in said particular place on said plurality of tracks in accordance with a spacing between a plurality of frames reproduced at said second speed.

8. The apparatus according to claim 6, wherein said slices of said lead frame data are distribution-recorded in a head portion of a main data area of each of said plurality of tracks, said head portion corresponding to said particular place on each of said plurality of tracks.

9. The apparatus according to claim 6, wherein:
said reproduction means comprises a reproducing head for reproducing data recorded on said recording medium; and
said slices of said lead frame data, sliced by said slicing means, are distribution-recorded in a local area of a main data area in said plurality of tracks, said reproducing head tracing said local area a reproduction at said second speed; and
said local area corresponds to said particular place on each of said plurality of tracks.

10. The apparatus according to claim 6, wherein said slices of said lead frame data, sliced by said slicing means, are distribution-recorded in a plurality of sub-code areas on said plurality of tracks, a respective sub-code area on each of said plurality of tracks corresponding to said particular place on each of said plurality of tracks.

* * * * *